(12) United States Patent
Kawada (10) Patent No.: US 11,806,787 B2
(45) Date of Patent: Nov. 7, 2023

(54) GAS FLOW NOZZLE FOR IRRADIATION BASED ADDITIVE MANUFACTURING

(71) Applicant: Sodick Co., Ltd., Kanagawa (JP)

(72) Inventor: Shuichi Kawada, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 56 days.

(21) Appl. No.: 17/540,182

(22) Filed: Dec. 1, 2021

(65) Prior Publication Data

US 2022/0193783 A1 Jun. 23, 2022

(30) Foreign Application Priority Data

Dec. 17, 2020 (JP) ................. 2020-208883

(51) Int. Cl.
| | | |
|---|---|---|
| *B22F 12/70* | (2021.01) | |
| *B22F 12/49* | (2021.01) | |
| *B33Y 30/00* | (2015.01) | |
| *B29C 64/371* | (2017.01) | |
| *B29C 64/153* | (2017.01) | |

(52) U.S. Cl.
CPC ............ *B22F 12/70* (2021.01); *B22F 12/49* (2021.01); *B29C 64/153* (2017.08); *B29C 64/371* (2017.08); *B33Y 30/00* (2014.12)

(58) Field of Classification Search
CPC ... B29C 64/371; B29C 64/364; B29C 64/153; B22F 12/70; B22F 12/49
See application file for complete search history.

(56) References Cited

U.S. PATENT DOCUMENTS

| | | | |
|---|---|---|---|
| 8,895,893 B2 | 11/2014 | Perret et al. | |
| 10,682,700 B2* | 6/2020 | Nyrhilä | B22F 10/322 |
| 10,744,565 B2* | 8/2020 | Okazaki | B22F 10/28 |
| 2017/0216916 A1* | 8/2017 | Nyrhilä | B22F 10/322 |
| 2018/0126460 A1* | 5/2018 | Murphree | B29C 64/245 |
| 2019/0151945 A1* | 5/2019 | Okazaki | B22F 3/1007 |
| 2020/0406533 A1 | 12/2020 | Muranaka | |
| 2021/0268588 A1* | 9/2021 | Higashi | B22F 12/38 |

FOREIGN PATENT DOCUMENTS

| | | | | |
|---|---|---|---|---|
| CN | 110014152 | | 7/2019 | |
| CN | 110014152 A | * | 7/2019 | ............. B22F 10/00 |
| JP | 2008542550 | | 11/2008 | |
| JP | 2018176213 | | 11/2018 | |
| JP | 2019094515 | | 6/2019 | |
| JP | 6611151 | | 11/2019 | |
| JP | 2020015931 | | 1/2020 | |

* cited by examiner

*Primary Examiner* — Xiao S Zhao
*Assistant Examiner* — Nicholas J Chidiac
(74) *Attorney, Agent, or Firm* — JCIPRNET (57) ABSTRACT

An additive manufacturing apparatus of the disclosure includes: a supply port that supplies an inert gas to a chamber; a supply nozzle which is attached to the supply port and releases two layers of airflow having different speeds toward the window; and a discharge port that discharges the inert gas from the chamber. The supply nozzle has: a first nozzle member having an inlet surface connected to the supply port; a net-like member which has a plurality of through holes and is attached in a manner of covering a portion of a lower part of an outlet surface of the first nozzle member; and a second nozzle member that is attached to the upper side of the outlet surface of the first nozzle member.

6 Claims, 7 Drawing Sheets

GAS FLOW NOZZLE FOR IRRADIATION BASED ADDITIVE MANUFACTURING

CROSS-REFERENCE TO RELATED APPLICATION

This application claims the priority benefits of Japanese application no. 2020-208883, filed on Dec. 17, 2020. The entirety of the above-mentioned patent application is hereby incorporated by reference herein and made a part of this specification.

BACKGROUND

Technical Field

The disclosure relates to an additive manufacturing apparatus, and particularly relates to a metal powder additive manufacturing apparatus that has a function of removing fumes to the outside of a chamber.

Related Art

Generally, a metal powder additive manufacturing apparatus has been widely known as a metal 3D printer. In a method of metal powder sintering and additive manufacturing using a laser light, metal material powder is uniformly sprinkled on a manufacturing table to form a material powder layer, a predetermined irradiation region of the material powder layer is irradiated with the laser light to form sintered layers, and the sintered layers are laminated and integrated, thereby producing a desirable three-dimensional molded object.

When the metal material powder is sintered by the laser light, it is required to make the environment around the predetermined irradiation region as oxygen-free as possible in order to protect the material powder from deterioration. Therefore, in the metal powder additive manufacturing apparatus, the predetermined irradiation region of the laser light is arranged inside a closed chamber, and an inert gas such as a nitrogen gas is supplied to the chamber, and thereby the laser light can be irradiated in an atmosphere where the oxygen concentration is sufficiently low.

In addition, when the material layer is irradiated with a laser light or an electron beam and the material layer is sintered or melted to form a solidified layer, metal vapors referred to as fumes are generated. When the fumes exist inside the chamber, for example, the fumes may shield the laser light or the electron beam, or the fumes may adhere to an optical component such as a window or the like arranged on an upper surface of the chamber, resulting in decrease in the quality of additive manufactured objects.

Therefore, in the conventional additive manufacturing apparatus, the inert gas is supplied to the chamber and the inert gas containing the fumes inside the chamber is discharged to maintain the inside of the chamber in a clean inert gas atmosphere. In addition, in order to reuse the discharged inert gas, the inert gas discharged from the chamber is sent to a fume collector, and then is returned to the chamber after the fumes have been removed.

Patent literature 1 discloses an additive manufacturing apparatus in which a first supply port and a second supply port are arranged in a chamber. In the disclosure, by supplying the inert gas to the chamber from the first supply port arranged on a wall surface of the chamber, the fumes around the irradiation region are recovered and the oxygen concentration is sufficiently lowered to protect the material powder from deterioration. Furthermore, by supplying the inert gas from the second supply port arranged on an upper surface of the chamber via a contamination prevention device that is arranged in a manner of covering a window, the window is prevented from being contaminated by the fumes, and the fumes that will cross an irradiation path of a laser light are excluded from the irradiation path.

Patent literature discloses a gas ejection device that ejects a shield gas SG from the outside of a chamber toward the inside of a processing region in order that the gas inside the processing region does not move to an optical device storage region. By forming a flow of the shield gas from the gas ejection device through the processing region and a suction port of a negative pressure pump, a backflow of the gas or the like toward the optical device storage region is prevented, and contamination of optical system components caused by sputtering or fumes is suppressed.

Patent literature 3 discloses an invention which includes, in a treatment tank for raw material treatment by a directional beam of electromagnetic radiation, a connection window, a first injection port which is arranged on one side of the connection window and is designed in a way that a first gas flows in substantially along a tangential direction on a window surface of the connection window, and a second injection port that is arranged and designed in a way that a second gas flows in substantially along the same direction as the flow of the first gas at a distance from the window surface. In a device having the treatment tank in the above-described invention, because the second gas flows along a direction away from the connection window, the gas that takes in the dirt generated from a treatment surface can be separated from the connection window, and an optical surface of the connection window can maintain cleanliness more effectively.

LITERATURE OF RELATED ART

Patent Literature

[Patent literature 1] Japanese Patent No. 6611151
[Patent literature 2] Japanese Patent Laid-Open No. 2018-176213
[Patent literature 3] National Publication of International Patent Application No. 2008-542550

SUMMARY

In the conventional additive manufacturing apparatus, the inert gas is supplied to the chamber to recover the fumes inside the chamber, and then the inert gas containing the fumes is discharged, thereby making the inert gas circulate inside the chamber to recover the fumes existing in a manufacturing region.

In addition, if the fumes adhere to the window which is an optical component when the material layer is sintered or melted to form the solidified layer, there is a possibility that the temperature of the adhering matter rises due to the laser light or the electron beam and the window is deformed, and a laser focal position that is originally adjusted to a build surface shifts and a build failure occurs. Thus, the inert gas is vigorously released from the outer periphery of the window, and the fumes are prevented from adhering to the window by a wind pressure of the inert gas.

As described above, conventionally, the inert gas is used for recovering the fumes inside the chamber and for preventing the fumes from adhering to the window, and a configuration is adopted which is realized by arranging the first supply port and the second supply port as in the inventions of Patent literatures 1 and 3, or a configuration is adopted which is realized by one supply port as in Patent literature 2.

However, when the size of the window is increased due to, for example, a plurality of galvano scanners being mounted on the additive manufacturing apparatus, or the like, it is necessary to release a large quantity of inert gas in order to prevent the fumes from adhering to the window by the wind pressure of the inert gas. As a result, there is a problem that the consumption of the inert gas increases and the running cost for driving the additive manufacturing apparatus sharply rises. In addition, depending on the size of the window, there is a problem that it is difficult to maintain the cleanliness of the window even if a large quantity of inert gas is released.

In view of the above problems, as a result of further diligent studies, the inventors of the application found that (1) by devising the shape of a nozzle arranged in the supply port and the like, it is possible to generate two layers of airflow having different speeds from one supply port, and (2) by using the above two-layer airflow, it is possible to prevent the window or the like which is an optical component from becoming dirty and remove the fumes of the manufacturing region effectively at the same time.

Thus, the disclosure mainly aims to provide an additive manufacturing apparatus capable of preventing the fumes from adhering to an optical component such as the window or the like and efficiently removing the fumes from the chamber. Some of the advantages that can be obtained by the disclosure are described in detail in the descriptions of embodiments of the disclosure.

An additive manufacturing apparatus includes: a chamber which covers a manufacturing region; an irradiation device which is arranged above the chamber and irradiates a material layer formed in the manufacturing region with a laser light or an electron beam to form a solidified layer; a window which is arranged on the upper part of the chamber and below the irradiation device and transmits the laser light or the electron beam; a supply port through which an inert gas is supplied to the chamber; a supply nozzle which is attached to the supply port and through which two layers of airflow having different speeds are released toward the window; and a discharge port which is arranged on a wall surface of the chamber facing the supply port and discharges the inert gas. The supply nozzle is configured by: a first nozzle member having an inlet surface connected to the supply port; a net-like member; a second nozzle member; and a plurality of partition members arranged on the second nozzle member. The net-like member has a plurality of through holes, and is attached in a state of being upright from a bottom surface of an outlet surface of the first nozzle member in a manner of covering a portion of a lower part of the outlet surface of the first nozzle member. The second nozzle member is arranged in a way of being attached to the upper side of the outlet surface of the first nozzle member in a way that an upper end of the net-like member and a bottom surface of the second nozzle member on the inlet side abut against each other, and arranged in a way of which a bottom surface of the second nozzle member on the outlet side below the window is parallel to a glass surface of the window. The bottom surface of the first nozzle member and the bottom surface of the second nozzle member on the inlet side are arranged in a way of being parallel to each other. In the inert gas introduced from the supply port, an upper airflow passes through the inside of the second nozzle member and is released in a flat shape over the entire region below the glass surface of the window as a first airflow by the plurality of partition members, and a lower airflow passes through the plurality of through holes of the net-like member and is released into the chamber as a second airflow having a speed lower than that of the first airflow.

Here, the "supply port" refers to a first supply port in the embodiment. By supplying an inert gas using the supply nozzle of the disclosure, a high-speed (high-speed layer) airflow parallel to the glass surface of the window can be generated in a region close to the window, and a low-speed (low-speed layer) airflow parallel to the high-speed airflow can be generated below the high-speed airflow. Because the high-speed layer airflow generates a new airflow in a direction away from the window due to the change in air pressure, the clean state of the window can be maintained, and furthermore, the intrusion of fumes into the window side can be prevented. In addition, the low-speed layer airflow generated below the high-speed layer airflow can capture the fumes in the manufacturing region and discharge the fumes to the outside of the chamber.

The additive manufacturing apparatus of the disclosure has the plurality of partition members for flattening the inert gas flowing inside the second nozzle member, and an upper part of the second nozzle member on the outlet side is opened.

According to the disclosure, because the inert gas is partitioned by the partition members and released, the speed of the inert gas is increased and the flow of the inert gas becomes flat, and thus a high-speed airflow can be generated over the entire region below the glass surface of the window.

In the additive manufacturing apparatus of the disclosure, an outer wall of the chamber has a shape inclined from a horizontal direction from the attachment position of the window to the attachment position of the discharge port.

In addition, in the additive manufacturing apparatus of the disclosure, the discharge port is formed to have a trapezoidal cross section.

According to the disclosure, because the outer wall of the chamber has a shape inclined from the horizontal direction from the attachment position of the window to the attachment position of the discharge port, and the discharge port is formed to have a trapezoidal cross section, the inert gas supplied from the supply nozzle passes below the window and is smoothly discharged from the discharge port along the outer wall of the chamber. Thus, the fumes can be effectively discharged.

In the additive manufacturing apparatus of the disclosure, the irradiation device has a plurality of galvano scanners.

According to the disclosure, two layers of airflow are generated from the supply nozzle and pass below the window, thereby preventing the window from becoming dirty, and thus even when the size of the window is increased, there is no need to release a large quantity of inert gas, and the running cost for driving the additive manufacturing apparatus can be reduced.

The disclosure can provide an additive manufacturing apparatus in which the consumption flow rate of an inert gas is reduced and which can maintain cleanliness even when the size of a window is increased, by using a supply nozzle that releases two layers of airflow having different speeds toward the window.

DESCRIPTION OF THE EMBODIMENTS

Hereinafter, embodiments of the disclosure are described with reference to the drawings. The various features shown in the embodiments described below can be combined with each other.

Figure 1:
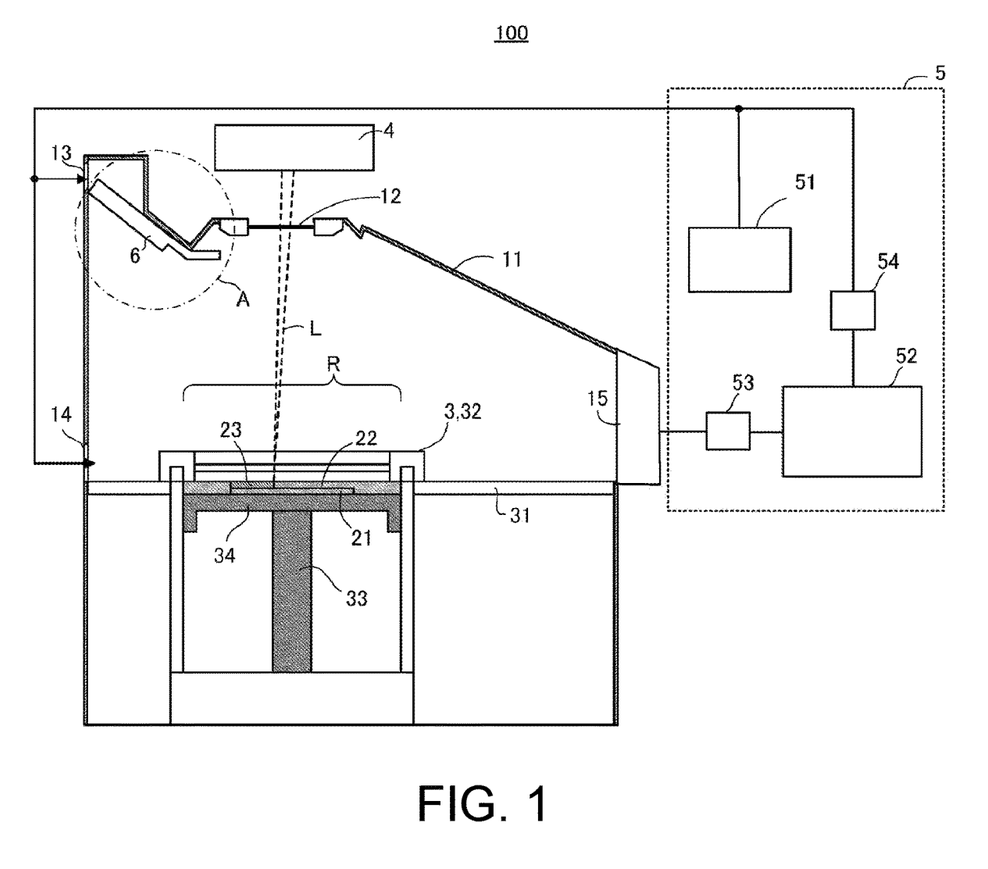
FIG. 1 is a schematic configuration diagram showing an additive manufacturing apparatus 100 of the embodiment.

FIG. 1 is a schematic configuration diagram showing an additive manufacturing apparatus 100 of the embodiment. As shown in FIG. 1, the additive manufacturing apparatus of the embodiment includes a chamber 11, a material layer forming device 3 arranged inside the chamber 11, an irradiation device 4, an inert gas supply/discharge mechanism 5, and a supply nozzle 6.

The chamber 11 is a housing configured to be substantially closed except for a supply/discharge path of the inert gas, and covers a manufacturing region R which is a region where a desirable three-dimensional molded object is formed.

The chamber 11 has: a window 12 which is arranged on the upper part and transmits a laser light L; a first supply port 13 and a second supply port 14 of the inert gas; and a discharge port 15 of the inert gas which is arranged on a wall surface facing the first supply port 13 and the second supply port 14. The shape of the outer wall of the chamber 11 is designed in a manner that the inert gas released from the first supply port passes below the window 12 and then smoothly flows along the wall surface of the chamber 11 to the discharge port 15. Specifically, the wall surface facing a surface on which the first supply port 13 is arranged has a shape inclined from a horizontal direction from the attachment position of the window 12 to the attachment position of the discharge port 15. The first supply port 13 and the second supply port 14 are supply ports for supplying the inert gas having a predetermined concentration to the chamber 11, and are connected to an inert gas supply device 51 and a fume collector 52. The inert gas generated by the inert gas supply device 51 and the inert gas from which the fumes are removed by the fume collector 52 are returned to the chamber 11 via the first supply port 13 and the second supply port 14.

The first supply port 13 is arranged at a position close to the window 12 above the wall surface of the chamber 11, and the second supply port 14 is arranged below the wall surface of the chamber 11.

The discharge port 15 is a discharge port that discharges the inert gas containing the fumes inside the chamber 11 to the outside, and is formed to have a trapezoidal cross section in a manner of easily sucking the inert gas inside the chamber 11. It is desirable that the discharge port 15 is arranged on the wall surface of the chamber 11 facing the first supply port 13 and on the substantially diagonal line of the first supply port 13 in a cross-sectional view, and specifically, it is desirable that the discharge port 15 is arranged below the wall surface of the chamber 11.

The material layer forming device 3 includes a base platform 31 having the manufacturing region R and a recoater head 32 arranged on the base platform 31 and configured to be movable in a horizontal single axis direction. Blades are respectively arranged on both side surfaces of the recoater head 32. The recoater head 32 is supplied with material powder from a material supply device (not shown), and reciprocates in the horizontal single axis direction while discharging the material powder accommodated therein from the bottom surface. At this time, the blade flattens the discharged material powder to form a material layer 22. In the manufacturing region R, a manufacturing table 34 that can be made to move in a vertical direction by a manufacturing table driving device 33 is arranged. When the additive manufacturing apparatus is used, a base plate 21 is arranged on the manufacturing table 34, and the material layer 22 is formed on the base plate 21.

The airflow of the inert gas supplied from the first supply port 13 passes below the window 12, then flows along the wall surface of the chamber 11, and finally is discharged from the discharge port 15. The effect of the airflow of the inert gas from the first supply port 13 makes it possible to remove the fumes above the manufacturing region R and prevent the window 12 from becoming dirty.

In addition, the airflow of the inert gas supplied from the second supply port 14 passes above the manufacturing table 34, and then is discharged from the discharge port 15. By the effect of the airflow of the inert gas from the second supply port 14, the fumes generated on an upper surface of the manufacturing table 34 at the time of sintering can flow toward the discharge port 15.

In the embodiment, two supply ports and one discharge port are arranged in the chamber 11, but the second supply port 14 can be omitted. In addition, the supply port connected to the inert gas supply/discharge mechanism 5 and the supply port connected to the fume collector 52 may be separately arranged.

Furthermore, when it is desirable to minimize the adhesion of fumes to the window 12, it is also possible to connect only the inert gas supply device 51 to the first supply port 13, and not to supply the reused inert gas to the first supply port 13.

Figure 2:
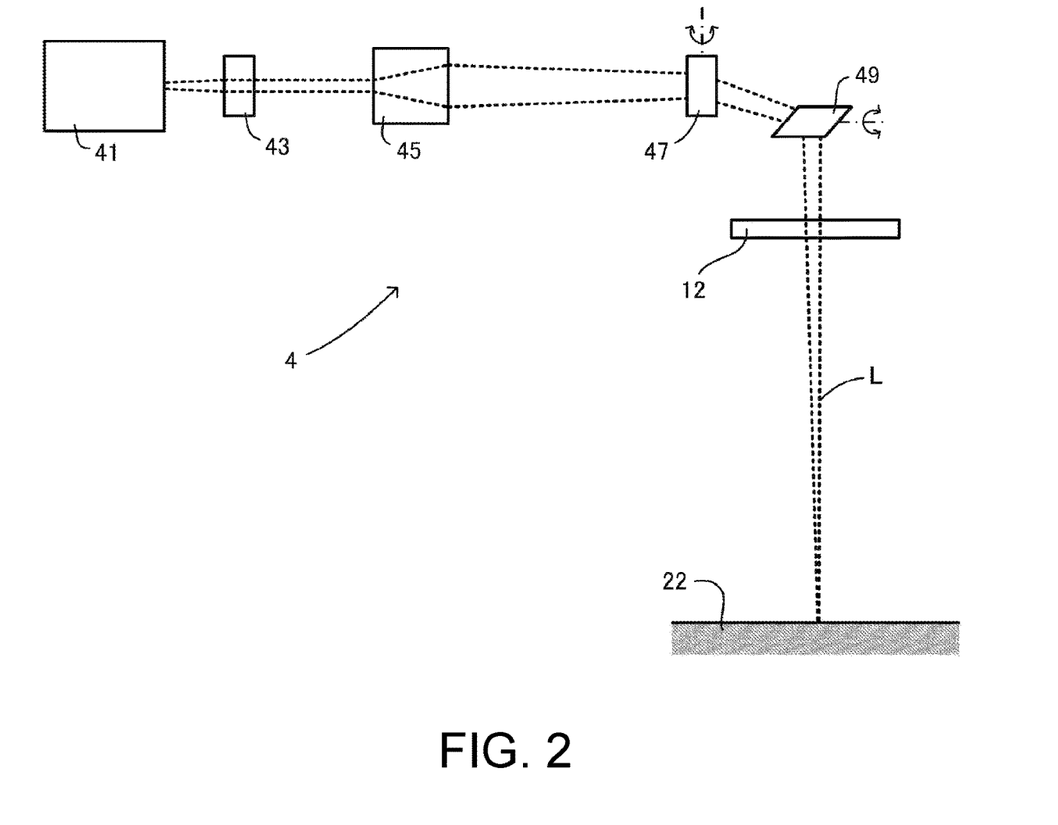
FIG. 2 is a schematic configuration diagram showing an irradiation device 4 of the above embodiment.

FIG. 2 is a schematic configuration diagram showing the irradiation device 4 of the above embodiment.

The irradiation device 4 is arranged above the chamber 11. The irradiation device 4 of the embodiment irradiates a predetermined location of the material layer 22 formed on the manufacturing region R with the laser light L, and the material powder at the irradiation position is sintered or melted to form a solidified layer 23. As shown in FIG. 2, the irradiation device 4 includes a light source 41, a collimator 43, a focus control unit 45, and a galvano scanner. The galvano scanner has an X-axis galvano mirror 47, a Y-axis galvano mirror 49, and an actuator that rotates the X-axis galvano mirror 47 and the Y-axis galvano mirror 49.

The light source 41 generates the laser light L. Here, the type of the laser light L is not limited as long as the laser light L can solidify the material layer 22, and the laser light L may be, for example, a $CO_2$ laser, a fiber laser, or a YAG laser. The collimator 43 converts the laser light L output from the light source 41 into parallel lights. The focus control unit 45 collects the laser light L output from the light source 41 and adjusts the collected light to a desirable spot diameter. The two-axis galvano scanner two-dimensionally scans the laser light L output from the light source 41.

Specifically, the rotation angles of the X-axis galvano mirror 47 and the Y-axis galvano mirror 49 are controlled according to the magnitude of a rotation angle control signal input from a control device (not shown), and the X-axis galvano mirror 47 and the Y-axis galvano mirror 49 respectively scan the laser light L in an X-axis direction and a Y-axis direction.

The laser light L that has passed through the X-axis galvano mirror 47 and the Y-axis galvano mirror 49 passes through the window 12 arranged on the upper surface of the chamber 11 to irradiate the material layer 22 formed on the manufacturing region R. The window 12 is formed by a material capable of transmitting the laser light L. For example, when the laser light L is a fiber laser or a YAG laser, the window 12 can be configured by quartz glass.

Additionally, the irradiation device 4 may be, for example, one that irradiates an electron beam to solidify the material layer 22 to form the solidified layer 23. For example, the irradiation device 4 may be configured to include: a cathode electrode that releases electrons; an anode electrode that converges and accelerates electrons; a solenoid that forms a magnetic field and converges directions of the electron beam in one direction; and a collector electrode which is electrically connected to the material layer 22 serving as an object to be irradiated and applies a voltage between the cathode electrode and the collector electrode.

Figure 3:
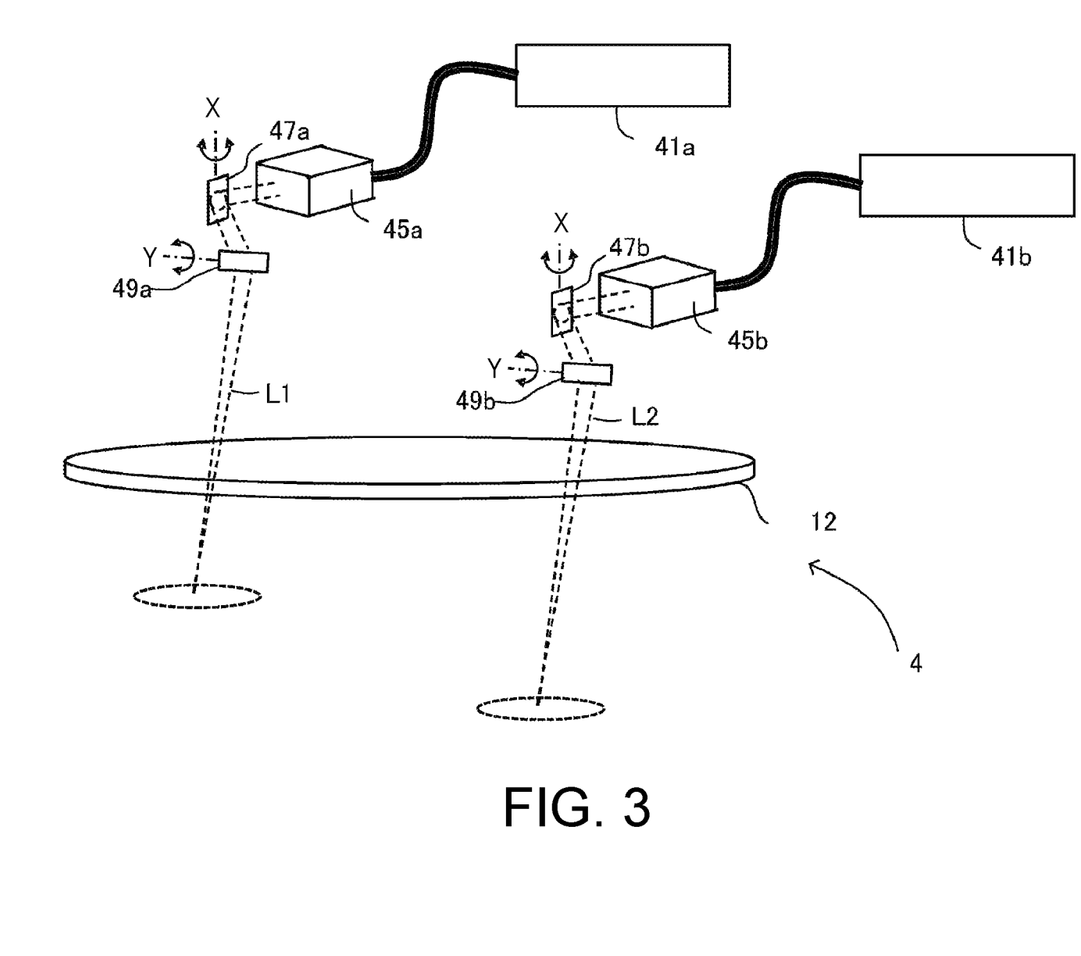
FIG. 3 is a schematic configuration diagram showing another example of the irradiation device 4 of the above embodiment.

FIG. 3 is a schematic configuration diagram showing another example of the irradiation device 4 of the above embodiment.

The irradiation device 4 may have a configuration in which a plurality of galvano scanners are arranged side by side. Specifically, the irradiation device 4 includes a first light source 41a and a second light source 41b, a first focus control unit 45a and a second focus control unit 45b, a first X-axis galvano mirror 47a and a second X-axis galvano mirror 47b, and a first Y-axis galvano mirror 49a and a second Y-axis galvano mirror 49b. The first X-axis galvano mirror 47a, the second X-axis galvano mirror 47b, the first Y-axis galvano mirror 49a, and the second Y-axis galvano mirror 49b are driven by a control device (not shown) to scan laser lights L1 and L2. The laser lights L1 and L2 pass through the window 12 arranged on the upper surface of the chamber 11 to irradiate the material layer 22 formed on the manufacturing region R. The size of the window 12 used in the additive manufacturing apparatus 100 on which a plurality of galvano scanners are mounted is great.

A desirable three-dimensional molded object is molded by the material layer forming device 3 and the irradiation device 4 described above. Firstly, the height of the manufacturing table 34 is adjusted to an appropriate position with the base plate 21 placed thereon. Next, the recoater head 32 is moved from the left side to the right side of the manufacturing region R in FIG. 1 to form the first-layer material layer 22 on the base plate 21. Next, the laser light L is irradiated to a predetermined position of the first-layer material layer 22 to form the first-layer solidified layer 23. Similarly, the height of the manufacturing table 34 is lowered by one layer of the material layer 22, and the recoater head 32 is moved from the right side to the left side of the manufacturing region R in FIG. 1, thereby forming the second-layer material layer 22 on the first-layer solidified layer 23. Next, the laser light L is irradiated to a predetermined position of the second-layer material layer 22 to form the second-layer solidified layer 23. The first-layer solidified layer 23 and the second-layer solidified layer 23 are fixed to each other. By repeating the above steps, the third-layer and subsequent solidified layers 23 are sequentially formed. In this way, the formation of the material layer 22 and the solidified layer 23 is repeated, and the desirable three-dimensional molded object is molded.

The inert gas supply/discharge mechanism 5 is a device that fills the inside of the chamber 11 with an inert gas having a predetermined concentration, discharges the inert gas containing the fumes from the chamber 11, and returns the discharged inert gas from which the fumes have been removed to the chamber 11.

The inert gas supply/discharge mechanism 5 includes the inert gas supply device 51, the fume collector 52, and duct boxes 53 and 54.

The inert gas supply device 51 is a device that supplies an inert gas having a predetermined concentration to the chamber 11, and specifically is an inert gas generator that generates an inert gas from the surrounding air or a gas cylinder in which an inert gas is stored. Note that, the inert gas refers to a gas that does not virtually react with the material layer 22 made of a metal material, the solidified layer 23 formed by the solidification of the metal material, and other gases containing oxygen, and may be, for example, nitrogen.

The fume collector 52 is a member that removes the fumes from the inert gas discharged from the chamber 11 and then returns the inert gas to the chamber 11, and a filter type member is used as the fume collector 52. The fume collector 52 is connected to the chamber 11 via the duct boxes 53 and 54.

Figure 4:
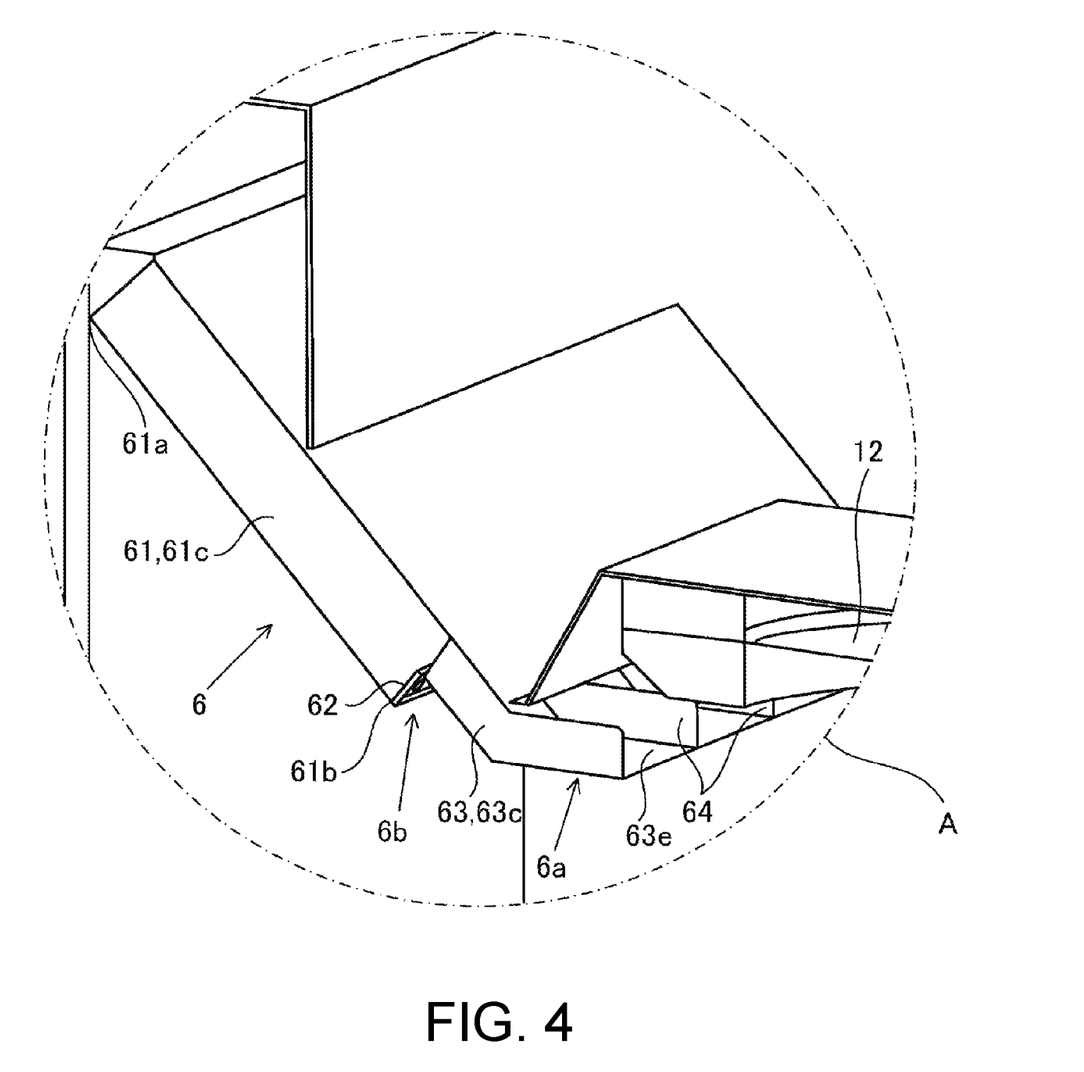
FIG. 4 is an enlarged schematic perspective view of A in FIG. 1 showing a supply nozzle 6 of the above embodiment.
Figure 5:
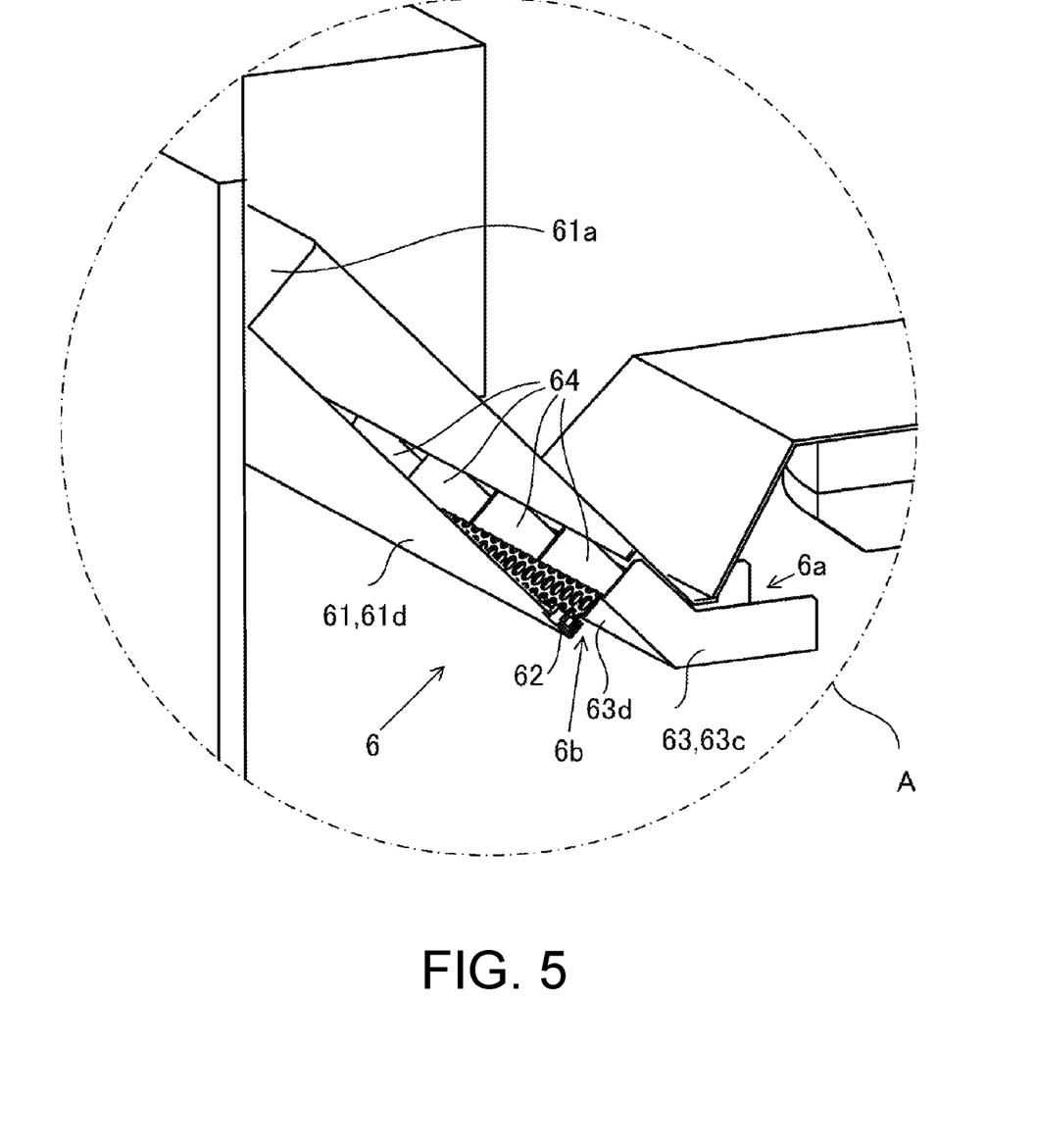
FIG. 5 is an enlarged schematic perspective view 2 of A in FIG. 1 showing the supply nozzle 6 of the above embodiment.

FIG. 4 is an enlarged schematic perspective view of A in FIG. 1 showing the supply nozzle 6 of the above embodiment, and FIG. 5 is an enlarged schematic perspective view 2 of A in FIG. 1 showing the supply nozzle 6 of the above embodiment. The supply nozzle 6 is a member that generates two layers of airflow having different speeds from the inert gas supplied from the first supply port 13, an inlet of the supply nozzle 6 is arranged in the first supply port 13, and an outlet of the supply nozzle 6 is arranged in a manner of being close to the window 12. The supply nozzle 6 is configured by a first nozzle member 61, a net-like member 62, a second nozzle member 63, and a plurality of partition members 64.

The first nozzle member 61 is a rectangular member having a hollow inside, an inlet surface 61a of the first nozzle member 61 is connected to the first supply port 13, and the net-like member 62 and the second nozzle member 63 are arranged on an outlet surface 61b of the first nozzle member 61. In FIG. 5, an outer wall surface 61c of the first nozzle member 61 is omitted for convenience in order to describe the internal structure.

The net-like member 62 is a flat plate-like member having a plurality of through holes, and is arranged in a state of being upright from a bottom surface 61d of the first nozzle member 61 on the lower side of the outlet surface 61b of the first nozzle member 61 in a manner of covering a part thereof. In the embodiment, the net-like member 62 is arranged in a lower half region of the outlet surface 61b of the first nozzle member 61. A second airflow outlet 6b is formed by the net-like member 62.

The second nozzle member 63 is a dish-like member formed in a dogleg shape and having outer wall surfaces 63c on the left and right, the upper part of the second nozzle member 63 on the outlet side is opened, and the plurality of partition members 64 are arranged inside the second nozzle member 63. With regard to the second nozzle member 63, an inlet surface 63a of the second nozzle member 63 is arranged on the upper side of the outlet surface 61b of the first nozzle member 61. In the embodiment, the inlet surface 63a of the second nozzle member 63 is arranged in an upper half region of the outlet surface 61b of the first nozzle member 61, and a bottom surface 63d of the second nozzle member 63 on the inlet side abuts against an upper end of the net-like member 62.

In addition, the bottom surface 63d of the second nozzle member 63 on the inlet side is arranged in a way of being parallel to the bottom surface 61d of the first nozzle member 61.

Furthermore, a bottom surface 63e of the second nozzle member 63 on the outlet side is arranged below the window 12 in a way of being parallel to a glass surface 12a of the window 12. Here, the outlet of the second nozzle member 63 is referred to as a first airflow outlet 6a.

The partition member 64 is a flat plate-like member formed in a dogleg shape and is erected inside the second nozzle member 63 in parallel with the outer wall surfaces 63c. A plurality of the partition members 64 are arranged at regular intervals.

Figure 6:
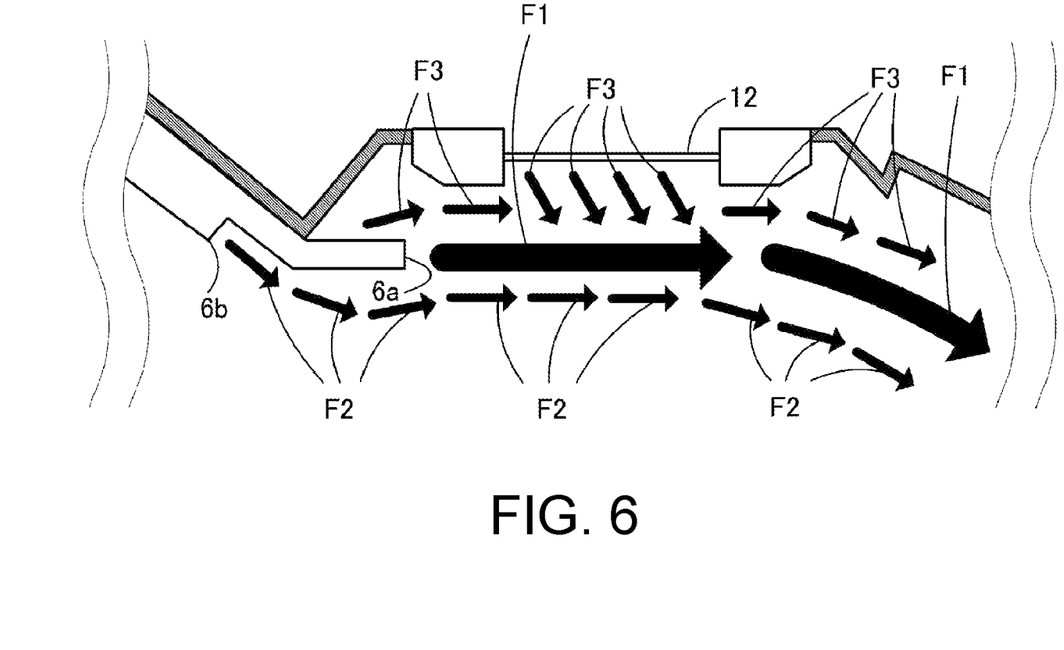
FIG. 6 is a schematic diagram showing the flow of airflow surrounding a window 12 of the above embodiment.
Figure 7:
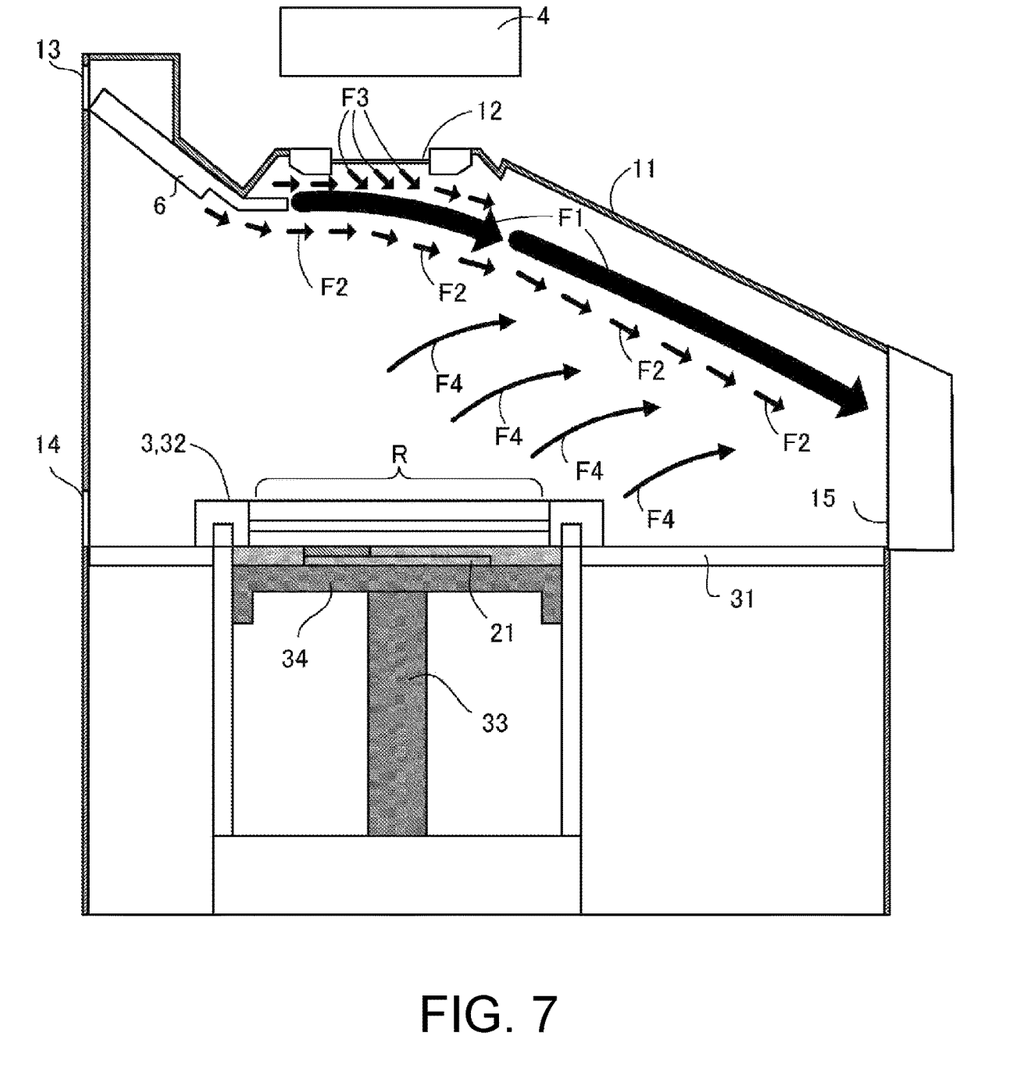
FIG. 7 is a schematic diagram showing the flow of airflow flowing inside a chamber 11 of the above embodiment.

FIG. 6 is a schematic diagram showing the flow of airflow surrounding the window 12 of the above embodiment, and FIG. 7 is a schematic diagram showing the flow of airflow flowing inside the chamber 11 of the above embodiment.

The inert gas introduced from the first supply port 13 flows from the inlet surface 61a of the first nozzle member 61 through the inside of the first nozzle member 61 to the outlet surface 61b of the first nozzle member 61. Thereafter, a lower airflow of the inert gas passes through the plurality of through holes of the net-like member 62, and is released as a second airflow F2 from the second airflow outlet 6b into the chamber 11. On the other hand, an upper airflow of the inert gas passes through the inside of the second nozzle member 63 to spread in a flat shape by the partition members 64, and is released as a first airflow F1 from the first airflow outlet 6a into the chamber 11. The first airflow F1 is an airflow parallel to the glass surface 12a of the window 12, and flows across the region below the entire glass surface 12a of the window 12.

The second airflow F2 has a speed lower than that of the first airflow F1 by passing through the plurality of through holes of the net-like member 62. The second airflow F2 is attracted to the first airflow F1 due to the difference in air pressure, and the two layers of airflow having different speeds, namely the first airflow F1 and the second airflow F2, flow below the window 12 in parallel with the glass surface 12a of the window 12.

As shown in FIG. 6, the high-speed first airflow F1 (high-speed layer) is formed in a region close to the window 12, and the low-speed second airflow F2 (low-speed layer) is formed in a region slightly away from the window 12. Thus, in the region close to the window 12, an airflow F3 having a low speed which is attracted to the high-speed layer (the first airflow F1) is generated due to a change in air pressure resulted from a difference in wind speed. Because the airflow F3 is always an airflow in a direction away from the window 12, the entry of the fumes toward the window 12 side can be prevented, and the clean state of the window 12 is maintained.

In addition, as shown in FIG. 7, the first airflow F1 which is a high-speed layer is discharged from the discharge port 15 along the wall surface of the chamber 11. At that time, the fumes that spring up from the manufacturing region R are attracted to the high-speed layer (the first airflow F1) and become a new airflow F4, and furthermore, the second airflow F2 which is a low-speed layer captures the fumes of the manufacturing region R, and the second airflow F2 and the airflow F4 containing the fumes are discharged from the discharge port 15 together with the high-speed layer (the first airflow F1).

In this way, because the airflow F3 in the direction away from the window 12 is always formed in the region close to the window 12, the adhesion of the fumes to the window 12 can be suitably prevented by the airflow F3 even when the size of the window 12 is increased. In addition, because the high-speed first airflow F1 itself plays a role of blocking the entry of the fumes from the manufacturing region R to the window 12 side, and further attracts the second airflow F2 and the airflow F4 containing the fumes that spring up from the manufacturing region R to be discharged from the discharge port 15, it is possible to achieve two purposes of recovering the fumes inside the chamber 11 and preventing the fumes from adhering to the window 12 at the same time.

A width of the second nozzle member 63 may be formed to be substantially the same as a width of the glass surface 12a of the window 12 so that the first airflow F1 flows over the entire region below the glass surface 12a of the window 12. Then it is possible to suitably protect the entire surface of the window 12.

As described above, embodiments of the disclosure have been described, but these embodiments are presented as examples and are not intended to limit the scope of the invention. These new embodiments can be implemented in various other forms, and various omissions, replacements, and modifications can be performed without departing from the gist of the invention. Each of the technical features shown in the embodiments can be combined with each other as long as there is no technical contradiction. These embodiments and modification examples are included in the scope and gist of the invention, as well as in the scope of the invention described in the claims and the equivalent scope thereof.

What is claimed is:

1. An additive manufacturing apparatus, comprising:
a chamber which covers a manufacturing region;
an irradiation device which is arranged above the chamber and irradiates a material layer formed in the manufacturing region with a laser light or an electron beam to form a solidified layer;
a window which is arranged on an upper part of the chamber and below the irradiation device and transmits the laser light or the electron beam;
a supply port through which an inert gas is supplied to the chamber;
a supply nozzle which is attached to the supply port and through which two layers of airflow having different speeds are released toward the window; and
a discharge port which is arranged on a wall surface of the chamber facing the supply port and discharges the inert gas; wherein
the supply nozzle includes:
a first nozzle member having a first nozzle inlet end connected to the supply port and a first nozzle outlet end opposite to the first nozzle inlet end, a net-like member disposed at the first nozzle outlet end,
a second nozzle member having a second nozzle inlet end and a second nozzle outlet end, and a plurality of partition members arranged on the second nozzle member;
the net-like member has a plurality of through holes, and is attached in a state of being upright from a bottom surface of the first nozzle outlet end in a manner of covering a portion of a lower part of the first nozzle outlet end of the first nozzle member;
the second nozzle member is disposed at an upper side of the first nozzle outlet end of the first nozzle member, an upper end of the net-like member abuts a bottom surface of the second nozzle inlet end of the second nozzle member, and is arranged in a way of which a bottom surface of the second nozzle outlet end of the second nozzle member below the window is parallel to a glass surface of the window;

the bottom surface of the first nozzle outlet end of the first nozzle member and the bottom surface of the second nozzle inlet end of the second nozzle member are parallel to each other; and in the inert gas introduced from the supply port, an upper airflow passes through the inside of the second nozzle member and is released in a flat shape over the entire region below the glass surface of the window as a first airflow by the plurality of partition members, and a lower airflow passes through the plurality of through holes of the net-like member and is released into the chamber as a second airflow having a speed lower than that of the first airflow.

2. The additive manufacturing apparatus according to claim 1, wherein an upper part of the second nozzle outlet end of the second nozzle member is opened.

3. The additive manufacturing apparatus according to claim 1, wherein an outer wall of the chamber has a shape inclined from a horizontal direction from an attachment position of the window to an attachment position of the discharge port.

4. The additive manufacturing apparatus according to claim 1, wherein the discharge port is formed to have a trapezoidal cross section.

5. The additive manufacturing apparatus according to claim 1, wherein the irradiation device has a plurality of galvano scanners.

6. The additive manufacturing apparatus according to claim 1, wherein the second nozzle member protrudes from the first nozzle outlet end of the first nozzle member.

* * * * *